Jan. 3, 1956     O. HEDLUND ET AL     2,729,578
WELDING APPARATUS AND METHOD

Filed July 16, 1952     4 Sheets-Sheet 1

INVENTORS
OSCAR HEDLUND
BY JOSEPH ARTHUR EDWARDS JR
ATTORNEYS

Jan. 3, 1956 O. HEDLUND ET AL 2,729,578
WELDING APPARATUS AND METHOD
Filed July 16, 1952 4 Sheets-Sheet 3

INVENTORS
OSCAR HEDLUND
BY JOSEPH ARTHUR EDWARDS JR.
Hudson, Boughton,
Williams, David & Hoffman
ATTORNEYS

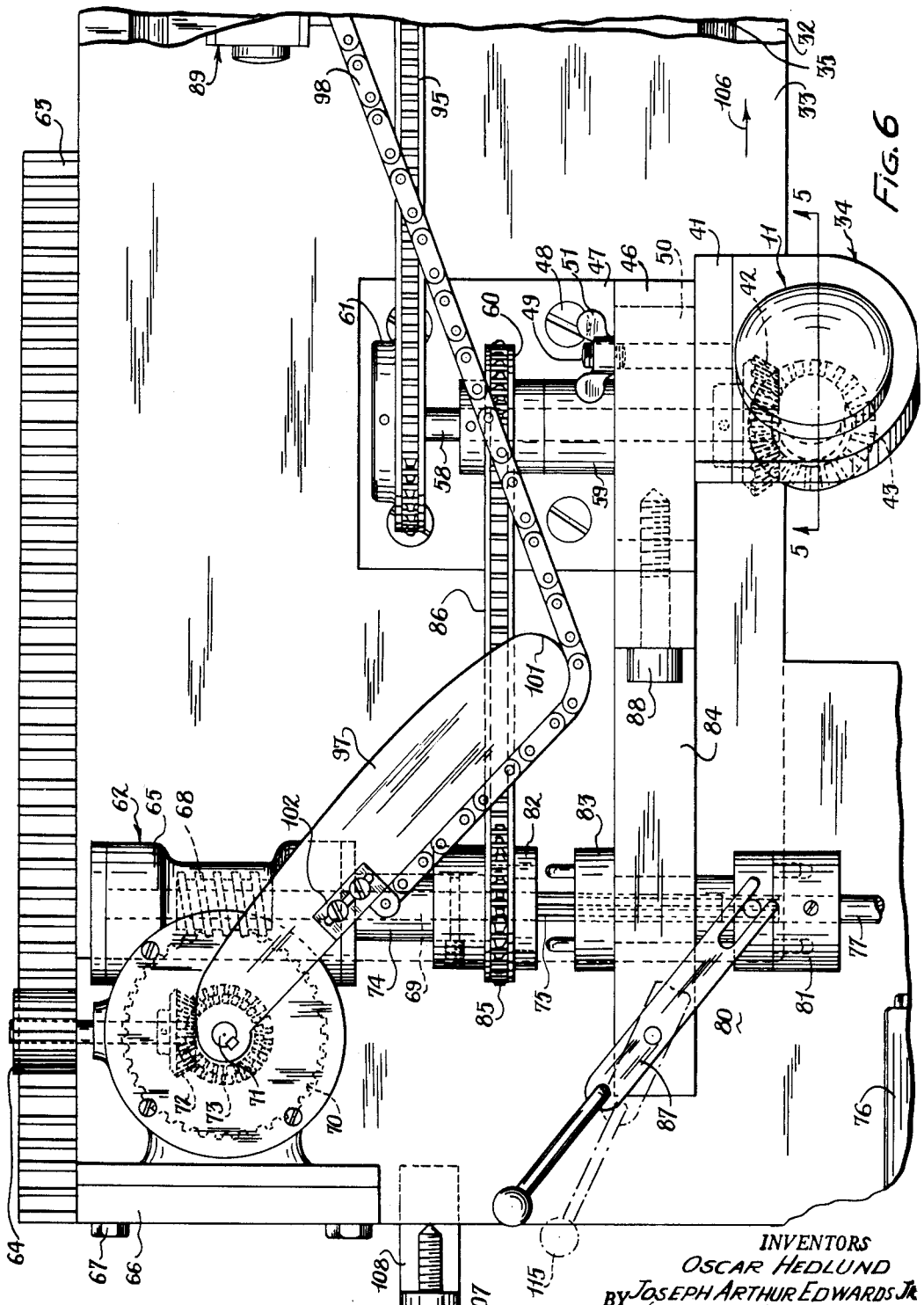

United States Patent Office 2,729,578
Patented Jan. 3, 1956

2,729,578

WELDING APPARATUS AND METHOD

Oscar Hedlund and Joseph Arthur Edwards, Jr., Battle Creek, Mich., assignors to Eaton Manufacturing Company, Cleveland, Ohio, a corporation of Ohio Application July 16, 1952, Serial No. 299,206

19 Claims. (Cl. 117—93)

This invention relates to a method and apparatus for welding and, more particularly, to a method and apparatus for carrying out a welding operation on a moving workpiece such as for applying a coating of weld material to a desired surface area of the workpiece. The invention is especially useful in applying such a coating to a specified area or surface portion of the head of an engine valve and has been disclosed herein as being used for that purpose, although the invention is not limited in this respect since it can be used for various other welding operations on relatively movable workpieces.

An object of the present invention is to provide a novel welding apparatus and method in which relative rotary and traversing movements are produced between a welding unit and the workpiece during the welding operation, such that a spirally extending weld is formed aggregating the desired coating and covering the specified area on the workpiece.

Another object is to provide a novel welding apparatus and method of this character in which the rate of the relative rotary and traversing movements is varied simultaneously and progressively during the welding operation.

Still another object is to provide a novel welding apparatus and method of the character mentioned in which the weld is started at a point located substantially on the axis of rotation of the workpiece and the rate of the rotary and traversing movements is decreased progressively during the welding operation, the workpiece preferably having a relatively rapid rate of relative movement at the start of the weld for preventing damage to the workpiece or contamination of the coating being formed by migration of base material thereinto from the body of the workpiece.

As another object, this invention provides novel welding apparatus in which a rotary workholder is carried by a table which is reciprocably movable relative to a welding unit and in which means is provided for simultaneously rotating the workholder and imparting traversing movement to the table, such that a weld being formed on the moving workpiece will extend over a desired portion thereof.

Yet another object is to provide novel welding apparatus of the kind above referred to in which the driving means for rotating the workholder and traversing the table includes variable speed mechanism by which the rotation of the workholder and the traversing of the table can be varied progressively during the welding operation.

It is also an object of this invention to provide novel welding apparatus of the type indicated above, in which a common driving means for the workholder and the traverse producing means includes a change speed gearing having a movable control member connected with a driven cam and in which a drive cam associated with the traverse producing means is flexibly connected with the driven cam and actuates the latter to progressively vary the control setting of the change speed gearing.

Another object is to provide novel welding apparatus of the kind just above indicated in which the means flexibly connecting the driving and driven cams has wrapped engagement therewith.

Additionally, this invention provides novel welding apparatus in which clutch controlled driving means is effective through the traverse producing means for causing a return movement of the table.

The invention can be further briefly summarized as consisting in certain novel steps of procedure and in certain novel combinations and arrangements of parts hereinafter described and particularly set out in the claims hereof.

In the accompanying sheets of drawings:

Fig. 6 is a partial plan view corresponding with a portion of Fig. 1 and showing the traverse producing means and the clutch means for the table return motor on a somewhat larger scale.

Figure 1:
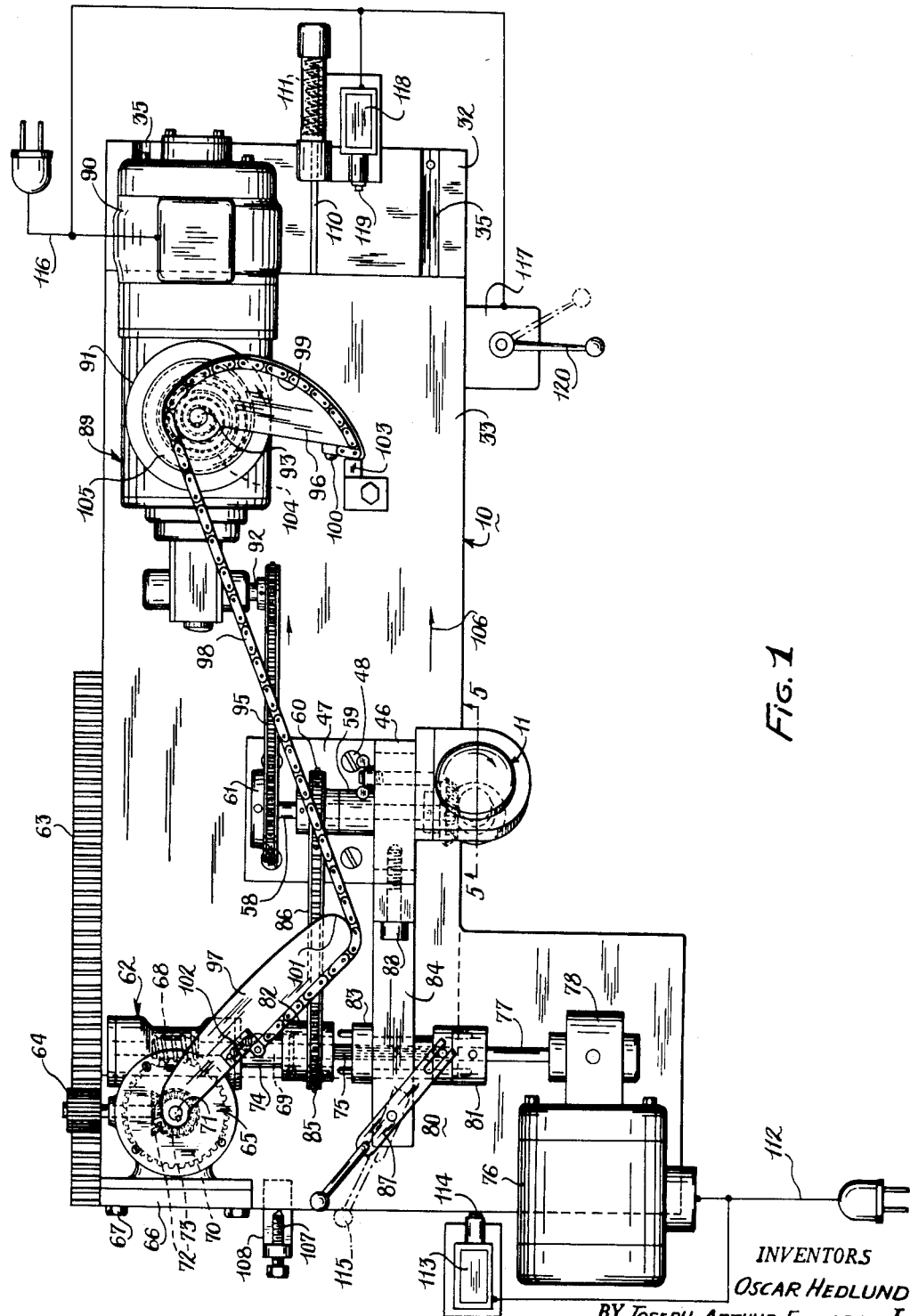
Fig. 1 is a top plan view showing welding apparatus embodying the present invention and with which the novel method can be carried out.

As representing one practical embodiment of the present invention, the drawings show welding apparatus 10 by which a desired welding operation can be carried out on a workpiece 11 during relative movement between the workpiece and the welding head 12 of a welding unit 13. The workpiece shown in this instance is a conventional engine valve having a head 14 and an axial stem 15. The engine valve can be either a completed valve or a valve blank or partially formed valve. Likewise, the engine valve can be of the solid type, or as shown in this instance, may be a hollow valve in which the head 14 is provided with a chamber 16 with which a passage 17 of the stem 15 communicates.

The welding operation to be performed on the engine valve 11 may be for the purpose of providing a desired coating or deposit on the top surface of the head 14, such as a corrosion and erosion resistant coating of a suitable non-ferrous metal or alloy, as for example, a nickel-chrome alloy. In the welding operation carried out with the method and apparatus herein disclosed, the welding operation is preferably, though not necessarily, started at a point located susbtantially on the central axis 18 of the workpiece and is continued from the starting point along a spiral path such that a spirally extending weld is formed whose convolutions aggregate the desired coating and cause the coating to extend in continuous relation over the portion of the head 14 intended to be covered. The weld is usually formed so as to extend to the outer circumferential edge or rim 19 of the workpiece.

In producing such a welded coating on an engine valve, or the like, it is important that contamination of the coating, by migration of the base metal of the workpiece into the coating during the welding operation, be kept at a minimum. It is also important to prevent the heat of the welding operation, which may be on the order of 7000° F., from damaging the workpiece. In the case of the workpiece 11, such damage thereto might occur through the heat-softening of the metal and the collapse of the hollow head 14. It is, therefore, important that the welding operation be carried out rapidly and, in accordance with the present invention, a relatively high rate of relative movement between the workpiece and the welding head 12 is employed during the starting of the weld so as to prevent the occurrence of the undesired effects just mentioned above. Such a high rate of relative movement between the workpiece and the welding head 12 is especially important when the starting point for the welding operation is located on the rotation axis 18 of the workpiece, as mentioned above.

The welding unit 13 may be any conventional form of welding apparatus and is here shown as being an arc welding apparatus employing a welding head of the kind adapted to supply an envelope of inert gas as a shield around the weld being formed. The welding head 12 is of this type and is here shown as also employing an electrode 20 for producing the arc. The welding unit 13 is here shown as including feeding and guiding devices 21 and 22 for a welding rod or wire 23 and by which the rod can be supplied to the welding head 12 at a desired rate, preferably a substantially constant rate.

The feeding device 21 may be of any suitable construction and is here shown as comprising cooperating grooved lower and upper feed rolls 24 and 25 between which the rod 23 passes. The lower roll 24 is a driven roll and the groove thereof is preferably provided with a knurled surface for gripping engagement with the welding rod 23. The roll 24 is connected with a suitable driving device, such as a manually controlled change speed gearing (not shown), by means of the shaft 26. The roll 25 is of the type having a resilient body 25a made of soft rubber, or the like, and may be shiftable relative to the driven roll 24 for pressing the welding rod against the latter. The feed rolls 24 and 25 are interconnected by suitable gears 27 and 28 which are pinned, or otherwise secured, to the shafts of these rolls.

The guide device 22 can be suitably located such as at a point relatively close to the welding head 12 for guiding and steadying the welding rod 23 being supplied thereto. This guide device may be of any conventional construction and, as here shown, may comprise cooperating lower and upper guide rolls 29 and 30 between which the welding rod passes. The guide device 22 is supported by the arm 22a so as to be adjustable both vertically and laterally relative to the welding head 12 and such that the welding rod 23 will be fed to the workpiece at the correct point thereof.

In addition to the welding unit 13, the welding apparatus 10 comprises, in general, a frame or base 32, a reciprocably movable table or carrier 33 and a rotatable workholder 34 carried by the table. The frame 32 has a guideway thereon along which the table 33 is longitudinally movable. In this instance, the guideway is defined by a pair of laterally spaced V-shaped grooves 35 formed in the frame 32 and with which a pair of laterally spaced V-shaped grooves 36 of the table cooperate. Groups of antifriction balls or rollers 37, located in the V-shaped grooves 35 and 36, support the table 33 on the frame 32 for relatively free movement along the guideway.

Figure 5:
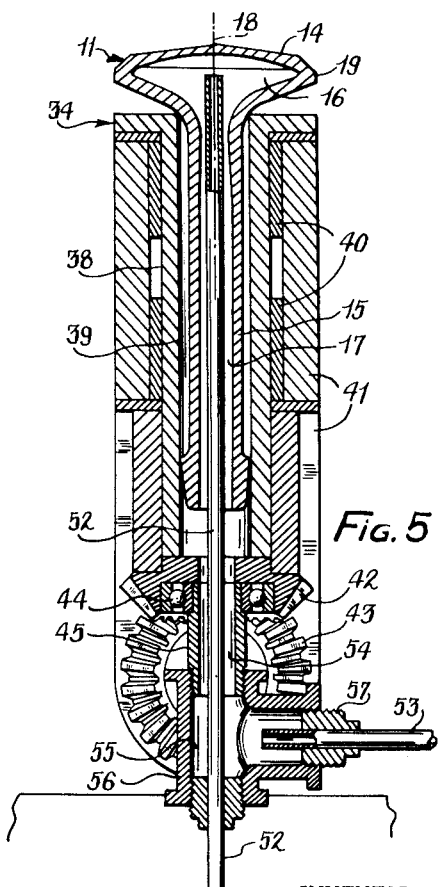
Fig. 5 is a vertical section taken through the workholder approximately as indicated by section line 5—5 of Fig. 1.

The workholder 34 comprises a holder or barrel 38 having an axial pocket 39 of a size and shape to receive the stem 15 of the workpiece 11. The holder 38 is rotatably mounted in the bearings 40 of a bracket 41 and is adapted to be driven by a pair of bevel gears 42 and 43, of which the gear 42 is connected with the lower end of the holder 38 and is rotatably supported by an antifriction bearing 44 mounted on a hollow post 45. The axial pocket 39 of the holder 38 is of a size and shape in relation to the stem 15 of the workpiece 11, such that when this stem is inserted thereinto in the position shown in Fig. 5, the workpiece will be supported by the workholder and rotated thereby.

Figure 2:
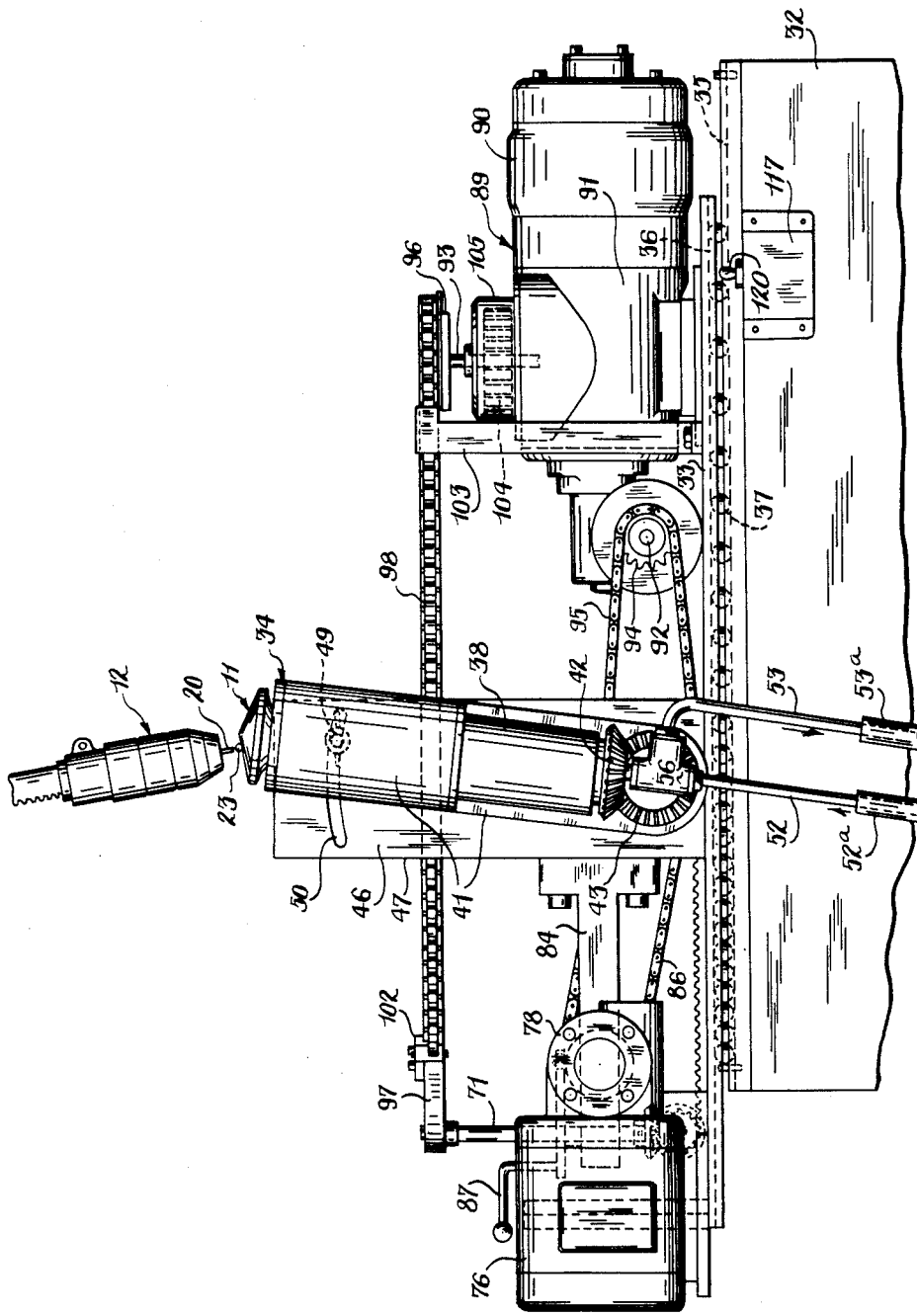
Fig. 2 is a side elevation of the apparatus.
Figure 3:
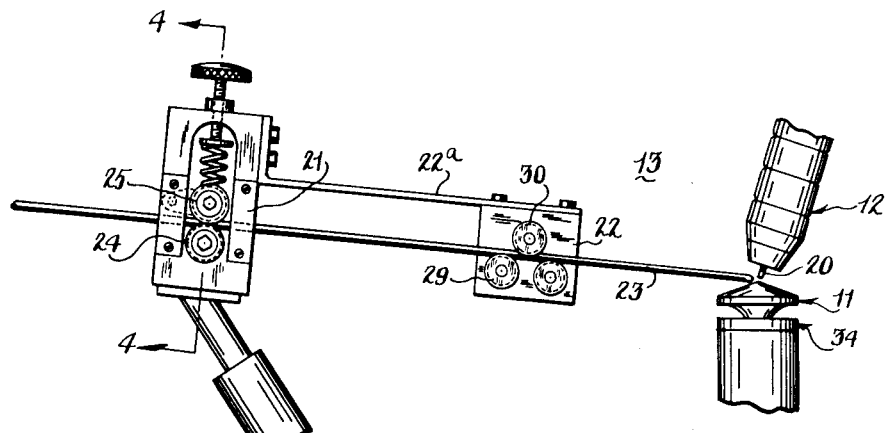
Fig. 3 is a partial side elevation of the workholder and the welding unit.
Figure 4:
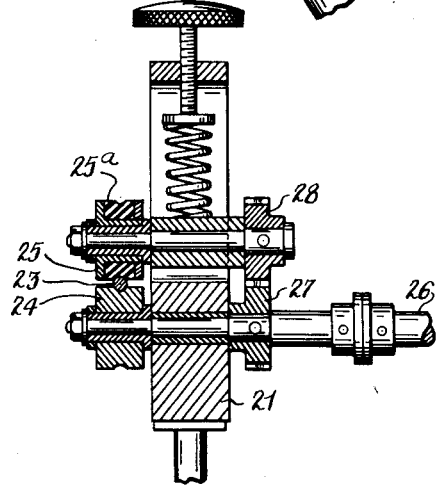
Fig. 4 is a partial transverse vertical section taken through the feeding means for the welding rod as indicated by section line 4—4 of Fig. 3.

The workholder 34 is mounted on the table 33 by connection of the bracket 41 with the upright leg 46 of a mount 47 which is secured to the table by the screws 48. The bracket 41 is connected with the leg 46 by means of a screw 49 which extends through an arcuate slot 50 of such upright leg and permits the workholder 34 to be swung about the axis of the gear 43 for adjustment to a relatively inclined position, such as that shown in Fig. 2, and which is desirable for facilitating the approach of the welding rod to the head 12 of the workpiece. The workholder 34 can be secured in such an inclined position of adjustment by tightening of the clamping nut 51.

It is desirable to supply water or other cooling medium to the workholder 34 during the welding operation. For this purpose, the workholder is provided with a supply tube 52 extending into the pocket 39 through the hollow post 45, and an exhaust tube 53 through which the cooling medium can be conducted from the workholder to a drain or the like. The return passage for the cooling medium is formed in part by the passage 54 of the hollow post 45 and in part by the passage of a T-fitting 56 through which the supply tube 52 extends. The exhaust tube 53 is connected with the passage 55 of the T-fitting 56 through a bushing 57. Hoses 52a and 53a form flexible extensions of the tubes 52 and 53.

When the workpiece 11 is a hollow engine valve, as shown in this instance, the supply tube 52 is of a length to extend through the hollow valve stem 15 and into the hollow head 14 for supplying the cooling medium to the chamber 16 of the latter. When the workpiece is a valve blank or an engine valve of the solid type, it is only necessary to cool the workholder 34 and, in that case, the supply tube 52 is shortened so as to deliver the cooling medium only into the lower portion of the axial pocket 39 of the workholder.

The rotary movement for the workholder 34 is supplied to the gear 43 through a shaft 58 on which this gear is mounted. The shaft 58 is rotatably supported by a laterally projecting bearing 59 of the mount 47 and has secured thereto, a pair of sprockets 60 and 61. The rotary movement for the workholder 34 is supplied to the shaft 58 through the sprocket 61, as will be further explained hereinafter.

The traversing and return movements of the table 33 are produced by a gear mechanism 62 which includes a rack 63 secured to the frame 32 and a pinion 64 meshing with such rack. The gear mechanism 62 also includes a reduction gearing 65 attached to an upright leg 66 of the table by the screws 67. This reduction gearing comprises a worm 68 mounted on a shaft 69 and driving a worm gear 70, and may provide a gear reduction ratio on the order of 30:1. The worm gear 70 is secured to a vertical shaft 71 from which the pinion 64 is driven through a pair of bevel gears 72 and 73. The shaft 69 projects from the reduction gearing 65 through a mounting sleeve 74 and is provided with a splined portion 75 adjacent its outer end.

The welding apparatus 10 also includes a table return means which is effective through the gear mechanism 62. This table return means comprises an electric motor 76 mounted on the table 33 and a shaft 77 connected with this motor through a gear device 78. The shaft 77 is disposed in axial alignment with the splined portion 75 of the shaft 69 and is adapted to be drivingly connected with the latter by a clutch device 80.

The clutch device 80 comprises a clutch head 81 secured to the shaft 77 and a clutch head 82 freely rotatable on the sleeve projection 74 of the reduction gearing 65. The clutch device 80 also comprises a clutch member 83 rotatably mounted in a clutch bracket 84 and slidably splined to the shaft portion 75. The freely rotatable clutch head 82 carries a sprocket 85 which is connected with the above-mentioned sprocket 60 by a chain 86.

The ends of the shiftable clutch member 83 and the adjacent ends of the clutch heads 81 and 82 are shaped for interfitting cooperating engagement, such that when the clutch member 83 is engaged with the clutch head 81 as shown in Fig. 1, the shaft 69 will be driven from the table return motor 76 through the shaft 77 and the clutch member 83 and, at this time, the clutch head 82 will rotate freely on the projection 74 as an idler. The clutch member 83 is shiftable by means of a clutch lever 87 and when this clutch member is moved to its opposite position, in which it engages the clutch head 82 and is disengaged from the clutch head 81, the clutch head 82 will be drivingly connected with the clutch member 83 and the latter will then rotate the shaft 69 by a driving force transmitted through the splined portion 75. The clutch bracket 84, which supports the shiftable clutch member 83, is secured to the upright leg 46 of the mount 47 by the screws 88 and also forms a pivotal support for the clutch lever 87.

The welding apparatus 10 also includes a common driving means for the rotatable workholder 34 and the traverse producing gear mechanism 62. This common driving means comprises an electric motor 90 and a change speed gearing 91 connected with this motor and mounted on the table 33. The change speed gearing 91 is provided with a rotatable output shaft 92 and a rotatable control shaft 93, and is of the kind having change speed mechanism or gearing therein which is responsive to actuation of this control shaft for varying the speed of rotation at which the output shaft 92 will be driven from the electric motor 90. A sprocket 94, mounted on the output shaft 92, is connected with the above-mentioned sprocket 61 by a chain 95.

From the construction and arrangement of the welding apparatus 10, as thus far described, it will be seen that the common drive means 89 supplies the actuating movement for the rotating workholder 34 and for the drive pinion 64 of the traverse producing mechanism 62. The rotary movement for the workholder 34 is applied to the shaft 58 through the chain 95 and the sprocket 61, and the rotary movement for actuating the gear mechanism 62 of the traverse producing means, is transmitted to the shaft 69 from the shaft 58 through the drive chain 86.

The progressive variation in the speed of rotation of the workholder 34 and in the speed of traversing movement of the table 33, which is desirable in producing the above-mentioned spirally extending weld on the workpiece 11, is accomplished by variation in the control setting of the change speed gearing 91. For this purpose, a driven cam 96 is secured to the control shaft 93 and is actuated by movement transmitted thereto from a driving cam 97 through a flexible connecting means which is shown, in this instance, in the form of the chain 98. The driven cam 96 has an effective cam surface 99 of a substantially spiral shape around which one end portion of the chain 98 is wrapped. The extreme end of this portion of the chain is secured to the cam 96 by means of the anchor screw 100.

The drive cam 97 is in the form of a substantially straight lever having a rounded outer end 101 and is mounted on the shaft 71 of the reduction gearing 62 by having its other or inner end secured to such shaft. The chain 98 has its other extreme end secured to the cam 97 by means of an anchor bracket 102 with a portion of the chain extending in wrapped relation around the rounded end 101 of this cam. The anchor bracket 102 is shiftable on the cam 97 for adjusting the length or tension of the chain 98 and is adapted to be clamped to the cam in the desired position of adjustment for the chain.

The change speed gearing 91 may be, for example, a variable speed gearing having a speed range for its output shaft 92 extending from 0 to 360 R. P. M. and in which a continuous progressive change in the speed of the output shaft can be produced by a continuous movement of the control shaft 93 by the driven cam 96. The cam 96 is shown in Fig. 1 in an initial position corresponding with a control setting for the change speed gearing 91 at which the output shaft 92 would be driven at its higher or maximum rate of speed. This initial position for the cam 96 is with the cam in engagement with a stop 103, which is here shown in the form of an upright bracket mounted on the table 33.

The control shaft 93 is moved to its initial control position by clockwise movement imparted thereto by a spiral spring 104 disposed in a spring casing 105 and having its inner end secured to the shaft and its outer end anchored on the spring casing. Rotation of the shaft 93 in a counterclockwise direction, for producing a decrease in the speed at which the output shaft 92 is driven, is produced by a counterclockwise swinging of the cam 96 in response to a pulling force transmitted thereto from the driving cam 97 through the chain 98. During this counterclockwise actuation of the cam 96, the chain 98 is partially unwrapped from the cam surface 99 thus progressively increasing the effective length of the chain and also progressively changing the point of tangency of the chain with the cam surface 99 and resulting in a progressively varying radial lever arm distance at which the pulling force of the chain is being applied to the cam.

The counterclockwise actuation of the control shaft 93 in this manner will, therefore, be at a progressively varying speed and the control setting of the change speed gearing 91 will, likewise, be altered at a progressively varying rate to produce a progressively varying decrease in the speed of rotation of the output shaft 92. The counterclockwise actuation of the cam 96 by the chain 98, also stresses the spiral spring 104 such that when the driving cam 97 is subsequently returned to its initial position, the spring will be effective to return the cam 96 to its initial position against the stop 103 and to actuate the control shaft 93 to its initial or maximum speed setting for the change speed gearing 91.

The table 33 is shown in Fig. 1 as being substantially at the left end of its return travel which is also its initial position and the starting point for its forward traversing movement. The direction of movement of the table 33 during the welding operation, is toward the right from this initial position as indicated by the directional arrow 106. This initial position is determined by the engagement of the left end of the table with an adjustable stop screw 107 which is mounted in a bracket 108 secured to the frame 32.

When the table 33 is in the initial position just described above, the location of the workholder 34, relative to the welding head 12, is such that the starting point for the weld on the head 14 will be substantially on the central axis 18 of the workpiece. During the start of the welding operation, the table 33 is actuated with a desired relatively rapid traversing movement in the direction of the arrow 106 and the workholder 34 is simultaneously rotated in a clockwise direction and also at a desired relatively rapid rate. The rapid traversing and rotary movements thus supplied to the workpiece 11 during the start of the welding operation, are at rates which have been selected to prevent the above-explained harmful effects of excessive heat and migration of metal of the workpiece.

As the welding operation proceeds from the starting point, the traversing and rotary movements are progressively decreased in rate of speed by the control movement supplied to the control shaft 93 of the change speed gearing 91 by the above-explained action of the cams 96 and 97. The rate of decrease in the traversing and rotary movements of the workholder is selected and accomplished, such that compensation will automatically be made for the progressively increasing diametral distance of the weld point from the central axis 18 as the welding operation proceeds. The net result of the speed control function is that the spiral weld will be formed on the workpiece at a substantially constant rate, regardless of this change in the diametral distance of the weld point, and will be produced at a rate which is sufficiently rapid to meet the above-explained conditions existing at the start of the welding operation.

With the welding apparatus and method of the present invention, a continuous coating of weld material of a desired depth can be applied to an airplane engine valve in a period of three minutes or less, so as to extend over the entire top surface of the head 14. The volume of metal deposited and the welding speed can be varied as desired, and different specific sizes and shapes of engine valves can be accommodated in the welding apparatus 10, by substituting cams of specifically different contours for the cams 96 and 97.

Error in the functioning of the welding apparatus 10, due to backlash between the rack 63 and the pinion 64, and at other points in the mechanism, is prevented by the application of a continuous force to the table 33 in a direction to take up existing lost motion. For this purpose, a push rod 110 applies such a continuous force to the table 33 under the action of a compression spring 111.

The table return motor 76 is supplied with energizing current from a suitable source through a conductor cord 112 and a normally closed limit switch 113 having an actuating plunger 114 adapted to be engaged by the left end of the table 33. When the table 33 has been returned to its initial position of Fig. 1, to bring the workpiece 11 into proper position under the welding head 12 for the start of the welding operation, the table engages the plunger 114 and opens the limit switch 113 to deenergize the motor 76 causing the table to be stopped and temporarily retained in its initial position. The welding operation is started by placing the welding unit 13 in operation, usually by manual control of the operator, and substantially simultaneously shifting the clutch lever 87 to the dotted line position 115. The shifting of the clutch lever to this position causes the traverse producing gearing 62 to be driven from the drive mechanism 89 to thereby start the traversing movement of the table for the welding operation.

The electric motor 90, of the common driving mechanism 89, is supplied with energizing current from a suitable source through a conductor cord 116, a control switch 117 and a normally closed limit switch 118 having a plunger 119 adapted to be engaged by the right end of the table 33. When the welding apparatus 10 is put into operation, the control member 120 of the switch 117 is moved from the "off" position in which it is shown in Fig. 1 to the dotted line "running" position F to thereby supply the motor 90 with energizing current whenever the limit switch 118 is in its closed condition. During the time that the electric motor 90 is running, the workholder 34 will be rotated continuously.

The combined traversing and rotary movements of the workpiece 11 beneath the welding head 12, result in the formation of a spirally extending weld on the head 14, as explained above, and which will aggregate the entire area of the surface of the workpiece intended to be covered by the weld material. By the time that the weld point arrives at the rim 19 of the workpiece, the right end of the table 33 will come into engagement with the plunger 119 and cause opening of the limit switch 118 thereby stopping the motor 90 and temporarily leaving the table at the extreme right end of its reciprocatory movement. At this time, the operator removes from the workholder 34, the workpiece 11 on which the welding operation has just been completed and substitutes therefor another such workpiece upon which the next welding operation is to be carried out.

The operator then shifts the clutch lever 87 to its broken line position 115, thereby connecting the table return motor 76 with the shaft 69 through the clutch member 83, such that the table return motor will drive the pinion 64 and cause the table to be returned to its initial position. The movement of the table back to its initial position brings the new workpiece into proper location under the welding head 12 at which time the table engages the plunger 114 of the limit switch 113 to deenergize the motor 76. The apparatus is now in condition for the start of the next welding operation. It will be understood, of course, that as soon as the table 33 has moved away from the stop 107, the limit switch 113 is reclosed to again energize the motor 76 which continues to run until the table is again returned to its initial position. Similarly, the movement of the table away from the limit switch 118 results in reclosing of this switch to re-start the motor 90 which continues to run until the completion of the next welding operation.

From the foregoing description and the accompanying drawings, it will now be readily understood that this invention provides a novel method and apparatus for rapidly and economically carrying out a welding operation on an engine valve, or the like, for the purpose of forming a desired coating or weld thereon and that this function is accomplished with an automatic variation in the rotary and traversing movements of the workpiece relative to the welding head, such that a spirally extending weld will be formed thereon at a substantially constant rate to aggregate the entire area of the valve surface to be covered. It will also be understood that this novel method and apparatus accomplish the automatic variation in the rotary and traversing movements of the workpiece with respect to a desired relatively high rate of speed for the rotary and traversing movements at the start of the weld, which is needed for preventing damage to the workpiece by the heat of the welding operation or by migration of base metal of the workpiece into the weld material being applied thereto. Additionally, it will now be understood that this novel welding apparatus embodies speed change means by which the progressive change in the rate of rotary and traversing movements is automatically accomplished and includes flexibly connected driving and driven cams through which a variable control movement is transmitted for producing such progressive change.

Although the novel method and welding apparatus of this invention have been illustrated and described herein to a somewhat detailed extent, it will be understood, of course, that the invention is not to be regarded as being limited correspondingly in scope, but includes all changes and modifications coming within the terms of the claims hereof.

Having thus described our invention, we claim:

1. The method of applying weld material to a desired area of an engine valve or like article which comprises, supporting the article adjacent a stationary welding head for simultaneous rotary and traversing movements with the traversing movement being substantially in a direction transverse to said welding head, operating said welding head to produce a weld formation on the article at an initial weld point of said desired area, simultaneously imparting rotary and traversing movements to said article such that the point of weld formation moves spirally over said desired area along convolutions lying at different radial distances from said initial weld point, and progressively varying the rates of speed of said rotary and traversing movements such that the adjacent convolutions of the weld formation are disposed in juxtaposed relation on the workpiece and aggregate the entire desired area.

2. The method of performing welding on an engine valve or like article which comprises, supporting the article adjacent a stationary welding head, starting the weld at a point of the article located substantially on an axis of said article, rotating the article about said axis and simultaneously imparting to the article a traversing movement in a direction transverse to said axis, and controlling the rates of the rotary and traversing movements and meanwhile continuing the weld such that the weld formation takes place along a spiral path having said point as its center and having its adjacent convolutions in a side-by-side relation and in continuous contact with each other.

3. The method of applying weld material to the top surface of the head of an engine valve or like article having connected head and stem portions which comprises, supporting the article adjacent a stationary welding head for simultaneous rotary and traversing movements, operating said welding head to produce a weld formation on the article at an initial weld point located within the area of said top surface and substantially on the rotation axis, and simultaneously imparting rotary and traversing movements to said article with the rotary movement being about the axis of the stem portion and the traversing movement being in a direction transverse to the rotation axis such that the path of relative movement for said weld point defines a spirally extending weld formation having said point as its center and which weld formation aggregates substantially the entire area of said top surface.

4. The method of welding an engine valve or like article which comprises, supporting the article adjacent a stationary welding head, starting the weld at a point of the article and substantially centrally of a surface of the article extending substantially normal to said axis located substantially on an axis of said article, rotating the article about said axis and simultaneously imparting to the article a traversing movement in a direction transverse to said axis, and continuing the weld during such rotary and traversing movements but with a decreased rate of speed for said rotary and traversing movements such that the weld formation takes place along a spiral having said point as its center and with its convolutions in juxtaposed relation and aggregating substantially the entire area of said surface.

5. The method of covering a desired head surface of an engine valve with weld material which comprises, supporting the valve adjacent a welding electrode, imparting to said valve a simultaneous rotary movement about its axis and a traversing movement relative to said electrode in a direction transverse to said axis and both of which movements are at an initial relatively high rate of speed, starting the weld during said initial high speed rotary and traversing movements and at a point of said head surface which is located substantially on said axis, decreasing the rates of said rotary and traversing movements of the valve, and continuing the weld during the decreased rates of rotary and traversing movements such that the path of the weld being formed is along a spiral having said point as its center and whose convolutions are in juxtaposed relation and aggregate substantially the entire desired head surface.

6. In welding apparatus, a reciprocable table having a rotatable workholder thereon, a stationary welding unit adjacent said table and operable to produce a spirally elongated weld on a moving workpiece held by said workholder, driving mechanism on said table and operable to cause rotation of the workholder and to also cause traversing movement of the table substantially in a direction transverse to said welding unit during said rotary movement of the workholder, and means effective through said driving mechanism to progressively vary the rates of said rotary and traversing movements such that adjacent convolutions of the spirally elongated weld are disposed in juxtaposed relation on the workpiece.

7. In welding apparatus, a reciprocable table having a rotatable workholder thereon, a welding unit adjacent said table and operable to produce a weld on a moving workpiece held by said workholder, a traverse producing means on said table and operable to cause traversing movement thereof, driving mechanism on said table and having a variable speed output operably connected to drive said traverse producing means and said workholder, and control means responsive to the operation of said traverse producing means and effective on said driving mechanism to progressively vary the speed of said rotary and traversing movements.

8. In welding apparatus, a welding unit operable to produce a spirally elongated weld on a moving workpiece, a carrier, means supporting said carrier for traversing movement substantially in a direction transverse to said welding unit, a workholder for said workpiece, means mounting said workholder for rotation on said carrier, mechanism operable to propel said carrier for causing said traversing movement thereof, driving means connected with said workholder and said mechanism to drive the same simultaneously and including change speed gearing, the movement of said workpiece relative to said welding unit and the spiral elongation of the weld being the resultant of said traversing movement of the carrier and the simultaneous rotary movement of said workholder, and control means effective on said change speed gearing to progressively vary the rate of said traversing movement of the carrier and the rate of said rotary movement of the workholder such that adjacent convolutions of the spirally elongated weld are disposed in juxtaposed relation on the workpiece.

9. In welding apparatus, a welding unit operable to produce a spirally elongated weld on a moving workpiece, a table, means supporting said table for traversing movement substantially in a direction transverse to said welding unit, a workholder for said workpiece, means mounting said workholder for rotation on said table, mechanism operable to propel said table for causing said traversing movement thereof, driving means mounted on said table and connected with said workholder and said mechanism to drive the same simultaneously and including change speed gearing, the movement of said workpiece relative to said welding unit and the spiral elongation of the weld being the resultant of said traversing movement of the table and the simultaneous rotary movement of said workholder, and control means also movable with said table and effective on said change speed gearing to progressively vary the rate of said traversing movement of the table and the rate of said rotary movement of the workholder such that adjacent convolutions of the spirally elongated weld are disposed in juxtaposed relation on the workpiece.

10. In welding appaartus, a welding unit operable to produce a weld on a moving workpiece, a carrier, means supporting said carrier for traversing movement relative to said welding unit, a workholder for said workpiece, means mounting said workholder for rotation on said carrier, mechanism operable to propel said carrier for causing said traversing movement thereof and including a driven control member, driving means connected with said workholder and said mechanism to drive the same simultaneously and including change sped gearing having a movable control member, the movement of said workpiece relative to said welding unit being the resultant of said traversing movement of the carrier and the rotary movement of said workholder, said movable control member being effective on said change speed gearing to progressively vary the rate of said traversing movement of the carrier and of said rotary movement of the workholder, and means flexibly connecting said movable control member with said driven control member to be actuated by the latter.

11. In welding apparatus, a welding unit operable to produce a weld on a moving workpiece, a table, means supporting said table for traversing movement relative to said welding unit, a workholder for said workpiece, means mounting said workholder for rotation on said table, mechanism operable to propel said table for causing said traversing movement thereof including a reduction gearing mounted on said table and a rotary control shaft driven by said reduction gearing, driving means mounted on said table and connected with said workholder and said reduction gearing and including a change speed gearing having a rotatable control shaft, the movement of said workpiece relative to said welding unit being the resultant of said traversing movement of the table and the rotary movement of said workholder, said rotatable control shaft being effective on said change speed gearing to progressively vary the rate of said traversing movement of the table and of said rotary movement of the workholder, a drive cam connected with the driven control shaft, a driven cam connected with said rotatable control shaft, and flexible motion transmitting means connected between said cams and having wrapped engagement therewith.

12. Welding apparatus as defined in claim 11 in which the portion of one of said cams with which said flexible means has wrapped engagement is a spirally extending cam surface tangentially engaged by said flexible means.

13. In welding apparatus, a reciprocable table having a rotatable workholder thereon, a stationary welding unit adjacent said table and operable to produce a spirally elongated weld on a moving workpiece held by said workholder, means supporting said table such that the reciprocation thereof comprises forward and return traversing movements substantially in a direction transverse to said welding unit, driving mechanism on said table and operable to cause rotation of the workholder and the traversing movement of the table in a forward direction, means effective through said driving mechanism to progressively vary the speeds of said rotary and forward traversing movements such that adjacent convolutions of the spirally elongated weld are disposed in juxtaposed relation on the workpiece, and return drive means on said table and effective through a portion of said driving mechanism for causing the return traversing movement of said table.

14. In welding apparatus, a frame having a guideway thereon, a table reciprocably movable along said guideway, a workholder having an axial pocket therein, means mounting said workholder on said table for rotary movement about the axis of said pocket, said workholder being adapted to hold an engine valve or the like with its head exposed and with its stem received in said pocket, a welding unit operable to produce a weld on said head during movement of said valve, a rack on said frame, traverse producing means for said table comprising a reduction gearing carried by said table and a pinion driven by said reduction gearing and meshing with said rack, driving mechanism mounted on said table comprising a power device and a change speed gear driven thereby and having a power take-off and a movable control member, means connecting said workholder and said traverse producing means with said power take-off to be driven therefrom, a drive cam connected with said reduction gearing to be actuated thereby, a driven cam connected with said movable control member, flexible transmission means connecting said driving and driven cams and having wrapped engagement therewith and effective to cause actuation of said driven cam and said control member in one direction, and spring means effective on said driven cam to move the same in the opposite direction and to apply tension to said flexible transmission means.

15. In welding apparatus a frame having a guideway thereon, a table reciprocably movable along said guideway, a workholder having an axial pocket therein, means mounting said workholder on said table for rotary movement about the axis of said pocket, said workholder being adapted to hold an engine valve or the like with its head exposed and with its stem received in said pocket, a welding unit operable to produce a weld on said head during movement of said valve, a rack on said frame, traverse producing means for said table comprising a reduction gearing carried by said table and a pinion driven by said reduction gearing and meshing with said rack, driving mechanism mounted on said table comprising a power device and a change speed gear driven thereby and having a power take-off and a movable control member, means connecting said workholder and said traverse producing means with said power take-off to be driven therefrom, a drive cam connected with said reduction gearing to be actuated thereby, a driven cam connected with said movable control member, flexible transmission means connecting said driving and driven cams and having wrapped engagement therewith and effective to cause actuation of said driven cam and said control member in one direction, spring means effective on said driven cam to move the same in the opposite direction and to apply tension to said flexible transmission means, a table return power device mounted on said table, and clutch means operable to connect said table return power device with said traverse producing means in driving relation to the latter.

16. In welding apparatus a frame having a guideway thereon, a table reciprocably movable along said guideway, a workholder having an axial pocket therein, means mounting said workholder on said table for rotary movement about the axis of said pocket, said workholder being adapted to hold an engine valve or the like with its head exposed and with its stem received in said pocket, a welding unit operable to produce a weld on said head during movement of said valve, a rack on said frame, traverse producing means for said table comprising a reduction gearing carried by said table and a pinion driven by said reduction gearing and meshing with said rack, driving mechanism mounted on said table comprising a first electric motor and a change speed gear driven thereby and having a power take-off and a movable control member, means connecting said workholder and said traverse producing means with said power take-off to be driven therefrom, a drive cam connected with said reduction gearing to be actuated thereby, a driven cam connected with said movable control member, flexible transmission means connecting said driving and driven cams and having wrapped engagement therewith and effective to cause actuation of said driven cam and said control member in one direction, spring means effective on said driven cam to move the same in the opposite direction and to apply tension to said flexible transmission means, a normally closed first limit switch located adjacent one end of said guideway and controlling said first electric motor and adapted to be engaged and opened by said table for stopping the traversing movement of said table and the rotation of said workholder, a second electric motor mounted on said table as a table return motor, clutch means operable to connect said table return motor with said traverse producing means in driving relation to the latter, and a normally closed second limit switch located adjacent the other end of said guideway and controlling said table return motor and adapted to be engaged and opened by said table.

17. In welding apparatus, a reciprocable table having a rotatable workholder thereon, a welding unit adjacent said table and operable to produce a weld on a moving workpiece held by said workholder, a traverse producing means on said table and operable to cause traversing movement thereof, driving mechanism on said table and having a variable speed output operably connected to drive said traverse producing means and said workholder, control means responsive to the operation of said traverse producing means and effective on said driving mechanism to progressively vary the speeds of said rotary and traversing movements, and conduit means connected with said workholder for supplying cooling medium thereto.

18. In welding apparatus, a stationary welding unit operable to produce a spirally elongated weld on a surface of a moving workpiece, a workholder rotatable about a rotation axis and having a work-receiving end adapted to receive and support the workpiece with said surface facing toward said unit, a carrier, means mounting said workholder on said carrier for rotation of the workholder about said rotation axis and with said work-receiving end extending toward said unit, means supporting said carrier for traversing movement relative to said unit and in a direction transverse to said rotation axis, mechanism operable to propel said carrier to cause said traversing movement thereof, and driving means connected with said workholder and said mechanism to drive the same simultaneously, the movement of said workpiece relative to said unit and the spiral elongation of the weld being the resultant of said traversing movement of the carrier and the rotary movement of said workholder.

19. In welding apparatus, a stationary welding unit operable to produce a spirally elongated weld on a surface of a moving workpiece, a workholder rotatable about a rotation axis and having a work-receiving end adapted to receive and support the workpiece with said surface facing toward said unit, a table, means mounting said workholder on said table for rotation of the workholder about said rotation axis and with said work-receiving end extending toward said unit, means supporting said table for traversing movement relative to said unit and in a direction transverse to said rotation axis, mechanism operable to propel said table for causing said traversing movement thereof including cooperating rack and pinion elements, and driving means mounted on said table and connected with said workholder and with the pinion element of said mechanism to drive said workholder and said pinion element simultaneously, the movement of said workpiece relative to said unit and the spiral elongation of the weld being the resultant of said traversing movement of the table and the rotary movement of said workholder.

References Cited in the file of this patent

UNITED STATES PATENTS

| | | |
|---|---|---|
| 2,373,638 | Perkins | Apr. 10, 1945 |
| 2,427,350 | Carpenter | Sept. 16, 1947 |
| 2,432,795 | Pearson | Dec. 16, 1947 |